United States Patent
Teilhet et al.

(10) Patent No.: US 9,729,569 B2
(45) Date of Patent: Aug. 8, 2017

(54) SOLUTION-CENTRIC REPORTING OF SECURITY WARNINGS

(71) Applicant: International Business Machines Corporation, Armonk, NY (US)

(72) Inventors: Stephen Darwin Teilhet, Milford, NH (US); Kristofer Alyn Duer, Manchester, NH (US); John Thomas Peyton, Jr., Arlington, MA (US); Omer Tripp, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 14/692,226

(22) Filed: Apr. 21, 2015

(65) Prior Publication Data
US 2016/0315960 A1    Oct. 27, 2016

(51) Int. Cl.
G06F 11/00    (2006.01)
H04L 29/06    (2006.01)
G06F 21/55    (2013.01)
H04L 29/08    (2006.01)

(52) U.S. Cl.
CPC .......... *H04L 63/1433* (2013.01); *G06F 21/55* (2013.01); *H04L 67/02* (2013.01)

(58) Field of Classification Search
CPC .................................................. H04L 63/1433
USPC ........................................................... 726/25
See application file for complete search history.

(56) References Cited

U.S. PATENT DOCUMENTS

| 7,284,274 | B1 * | 10/2007 | Walls ........................ G06F 8/70 726/22 |
| 7,448,067 | B2 | 11/2008 | Yadav |
| 7,584,298 | B2 | 9/2009 | Klinker et al. |
| 7,673,043 | B2 * | 3/2010 | Keir ...................... G02B 5/3083 709/224 |
| 2011/0277034 | A1 * | 11/2011 | Hanson ............... H04L 63/1433 726/25 |
| 2014/0090070 | A1 | 3/2014 | Tripp |
| 2014/0165204 | A1 * | 6/2014 | Williams ................ G06F 21/55 726/25 |
| 2014/0189875 | A1 | 7/2014 | Beskrovny et al. |

FOREIGN PATENT DOCUMENTS

WO    0125935 A1    4/2001

* cited by examiner

*Primary Examiner* — Teshome Hailu
(74) *Attorney, Agent, or Firm* — Jeffrey S. LaBaw; David H. Judson

(57) ABSTRACT

A new paradigm for security analysis is provided by transitioning code analysis reporting from the problem space (the warnings themselves), to a solution space (potential solutions to the identified problems). Thus, instead of reporting raw findings to the user, the automated system as described here outputs proposed solutions to eliminate the defects identified in the security analysis. A consequence of this approach is that the report generated by the analysis tool is much more consumable, and thus much more actionable. Preferably, the report provides the user with one or more candidate location(s) at which to apply a fix to an identified security problem. These locations preferably are identified by processing overlapping nodes to identify one or more solution groupings that represent an API for a sanitization fix. The report also includes one or more recommendations for the fix, and preferably the report is generated on a per-vulnerability type basis.

15 Claims, 9 Drawing Sheets

Static Analyzer Report

This report includes important security information about your application.

| | |
|---|---|
| Scan name: | AltoroJ 2.7 Eclipse |
| Scan file name: | AltoroJ 2.7 Eclipse |
| Scan started: | April 17, 2015 19:26:32 UTC |
| Scan type: | SAST |

Summary of security issues

| | |
|---|---|
| High severity issues: | 2 |
| Total security issues: | 2 |

Executive Summary

Issue Types: 1

Injection.SQL     2

▓ High ▒ Medium ░ Low ░ Informational

Number of Issues

Go to Table of Contents

Fix Recommendations: 1

Statement.executeQuery {DBUtil.java=133}     2

▓ High ▒ Medium ░ Low ░ Informational

Number of Issues

Go to Table of Contents

FIG. 9

Issues

| H | Injection.SQL 2 |

Issue 1 of 2

Injection.SQL
Severity: High
Synopsis: Not available
Fix: Statement.executeQuery{DBUtil.java=133}

Sink:
java.sql.Statement.excuteQuery(String):ResultSet

| Method | File | Tainted Arg |
|---|---|---|
| ☐ com.ibm.security.appscan.altoromutual.servlet.LoginServlet.doPost(HttpServletRequest;HttpServletResponse):void | | |
| ↑ javax.servlet.ServletRequest.getParameter(String):String | LoginServlet.java:78 | return value |
| ☐ *com.ibm.security.appscan.altoromutual.util.DBUtil.isValidUser(String;String):boolean* | *LoginServlet.java:85* | *username* |
| ↑ java.lang.StringBuilder.append(string):StringBuilder | DBUtil.java:133 | user |
| ↑ java.lang.StringBuilder.append(string):StringBuilder | DBUtil.java:133 | new StringBuild... |
| ↑ java.lang.StringBuilder.append(string):StringBuilder | DBUtil.java:133 | new StringBuild... |
| ↑ java.lang.StringBuilder.toString():String | DBUtil.java:133 | new StringBuild... |
| ↑ *java.sql.Statement.excuteQuery(String):ResultSet* | *DBUtil.java:133* | *new StringBuild...* |

FIG. 10A

Issues

Issue 2 of 2

Injection.SQL

Severity: [High]

Synopsis: Not available

Fix: Statement.executeQuery{DBUtil.java=133}

Sink:

java.sql.Statement.excuteQuery(String):ResultSet

| Method | File | Tainted Arg |
|---|---|---|
| com.ibm.security.appscan.altoromutual.servlet.LoginServlet.doPost(HttpServletRequest;HttpServletResponse):void | | |
| javax.servlet.ServletRequest.getParameter(String):String | LoginServlet.java:82 | return value |
| java.lang.String.trim():String | LoginServlet.java:83 | password |
| java.lang.String.toLowerCase():String | LoginServlet.java:83 | password.trim() |
| *com.ibm.security.appscan.altoromutual.util.DBUtil.isValidUser(String;String):boolean* | *LoginServlet.java:85* | *password* |
| java.lang.StringBuilder.append(String):StringBuilder | DBUtil.java:133 | password |
| java.lang.StringBuilder.append(String):StringBuilder | DBUtil.java:133 | new StringBuild... |
| java.lang.StringBuilder.toString():String | DBUtil.java:133 | new StringBuild... |
| *java.sql.Statement.executeQuery(String):ResultSet* | *DBUtil.java:133* | *new StringBuild...* |

FIG. 10B

Fix Recommendations

H  Statement.executeQuery {DBUtil.java=133}                                    Go to Table of Contents

Issue Types that this task fixes
- Vulnerability.Injection.SQL (2)

Signature:
java.sql.Statement.executeQuery(String):ResultSet

Alternate Signatures:
- com.ibm.security.appscan.altoromutual.util.DBUtil.isValidUser(String;String):boolean
- java.lang.StringBuilder.append(String):StringBuilder
- java.lang.StringBuilder.toString():String

Example Trace:

| Method | File | Tainted Arg |
|---|---|---|
| com.ibm.security.appscan.altoromutual.servlet.LoginServlet.doPost(HttpServletRequest;ServletResponse):void | LoginServlet.java:78 | return value |
| javax.servlet.ServletRequest.getParameter(String):String | LoginServlet.java:85 | *username* |
| *com.ibm.security.appscan.altoromutual.util.DBUtil.isValidUser(String;String):boolean* | | user |
| java.lang.StringBuilder.append(string):StringBuilder | DBUtil.java:133 | new StringBuild... |
| java.lang.StringBuilder.append(string):StringBuilder | DBUtil.java:133 | new StringBuild... |
| java.lang.StringBuilder.append(string):StringBuilder | DBUtil.java:133 | new StringBuild... |
| java.lang.StringBuilder.toString():String | DBUtil.java:133 | new StringBuild... |
| *java.sql.Statement.excuteQuery(String):ResultSet* | *DBUtil.java:133* | *new StringBuild...* |

FIG. 11

SOLUTION-CENTRIC REPORTING OF SECURITY WARNINGS

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data. Web and mobile applications, in particular, increasingly are the target of many attacks and attack types. These include, for example, cross-site scripting (XSS), cross-application scripting (XAS), SQL injection (SQLi), log forging, and many others.

Given the size and complexity of modern software, which often consists of multiple abstraction layers, includes large third party libraries, and performs non-trivial pointer-based computations, there is a clear and growing need for automated methods for detection of potential security vulnerabilities, such as those mentioned above. To address this need, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. Static analysis may be implemented as a standalone (e.g., desktop) tool "on-premises," or provided "as a service," using cloud-based resources. A representative commercial offering of this type is IBM® Security AppScan®, which enhances web application security and mobile application security, improves application security program management and strengthens regulatory compliance.

While static analysis has shown impressive success as an industry solution, some existing tools often report many false findings. This is not necessarily surprising, as automated analysis tools are challenged by the need to scale to large programs while executing fast and efficiently. There are also different aspects of various web and mobile applications that are difficult to model accurately, such as path conditions and deployment settings (e.g., browser version, back-end database, or the like). For the user, however, a significant usability barrier to such products and services is the need to review a prohibitive number of findings that are mostly false warnings. The user has to spend a long time on each finding, where typically false alarms are harder to prove as such than true vulnerabilities. This is because the user typically is in doubt whether there is something he or she is missing when concluding that the defect reported by the analysis is not a real one.

An available solution to reducing the size of the problem space is for the user to influence which findings the analysis reports and how those findings are reported. For example, by editing applicable security rules, the user can request that the system not report any potential vulnerability that involves a certain resource, such as database APIs. The user also can control the severity level of a particular security rule, which has the effect of adjusting or modifying the category and priority assigned to a security alarm. While configuring security rules in this manner provides some advantages in addressing the problem, there remains a need to address the usability problem of the reports generated by static security analysis.

BRIEF SUMMARY

According to this disclosure, a new paradigm for security analysis is provided and, in particular, by transitioning the analysis report from the problem space (the warnings themselves) to a solution space (potential solutions to the identified problems). Thus, instead of reporting raw findings to the user, the system here outputs proposed solutions to eliminate the defects. A consequence of this approach is that the report generated by the analysis tool is much more consumable, and thus much more actionable. Preferably, the report provides the user with one or more candidate location(s) at which to apply a fix to an identified security problem.

To this end, the approach herein provides for an automated technique to receive the code pathway traces generated by the analysis tool, and to process those traces (and, in particular, the incident nodes therein) to attempt to locate optimal fix points where a validator or sanitizer can remove the potentially malicious data from the system while allowing good data to continue through. A node represents a location in a source file. Preferably, the traces are processed using one or more different "solution group" methods. For example, a basic solution group method identifies common nodes in the traces. In this approach, nodes for each finding are iterated and added to a list of common nodes. The list is then incremented for each occurrence in a finding for the common node. This method produces solution groups that have at least the one node in common with no other considerations. Other solution group methods seek to identify a most common node shared among a group of findings that is closest to a source of taint node without being the source of taint, or to identify a most common node shared among of findings that is closest to a sink node without being the sink. More generally, the notion is to group findings, preferably based on common and user-accessible nodes, to identify a smaller list of user-addressable solution points. These points are then included in the output report.

Because different vulnerabilities require different types of solutions, and as an optimization, preferably the approach described herein is implemented on a per-vulnerability type basis as opposed to processing all findings together.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 9 depicts a first portion of a solution-centric report generated by the technique of this disclosure;

FIG. 10 depicts a second portion of the solution-centric report; and

FIG. 11 depicts a third portion of the solution-centric report.

DETAILED DESCRIPTION OF AN ILLUSTRATIVE EMBODIMENT

Figure 1:
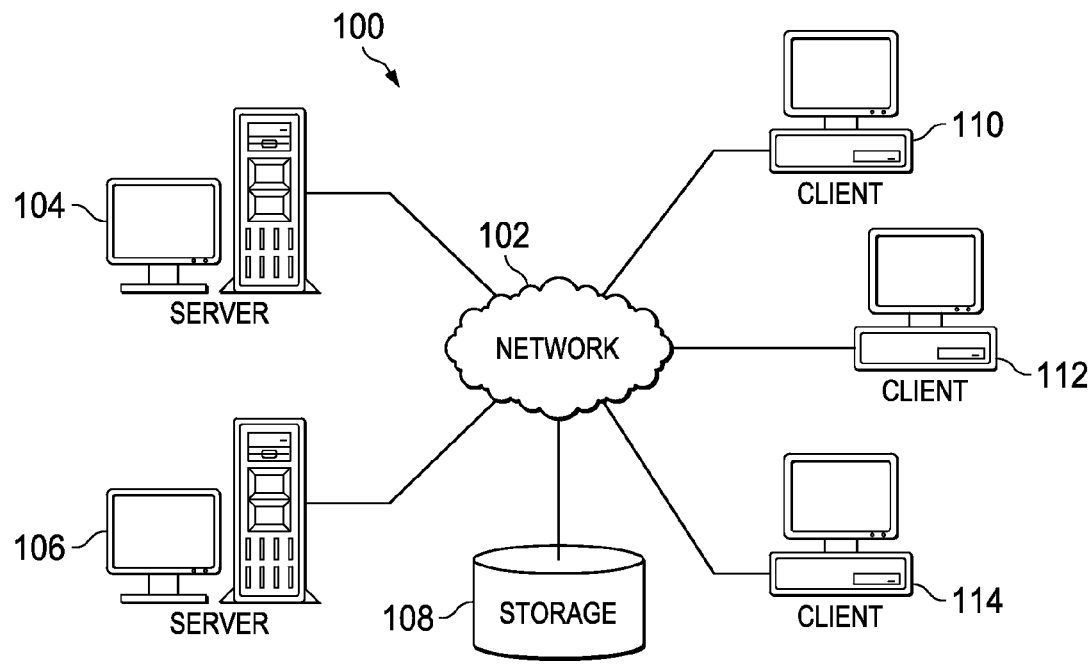
FIG. 1 depicts an exemplary block diagram of a distributed data processing environment in which exemplary aspects of the illustrative embodiments may be implemented.
Figure 2:
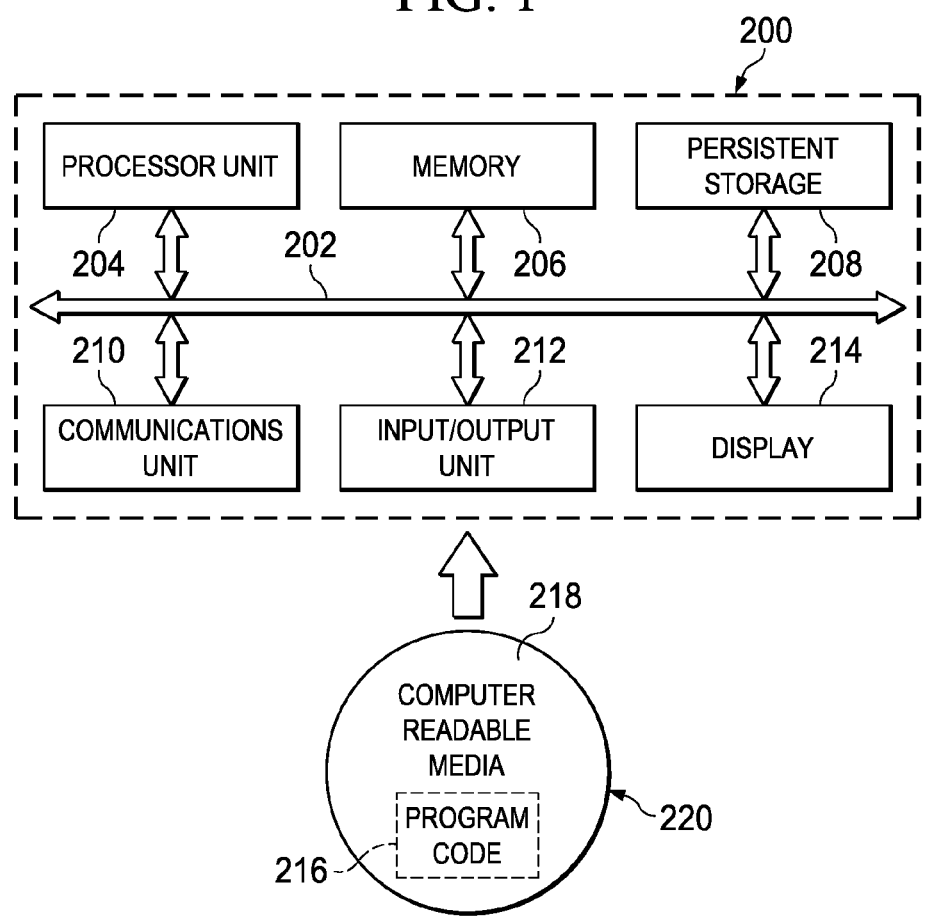
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
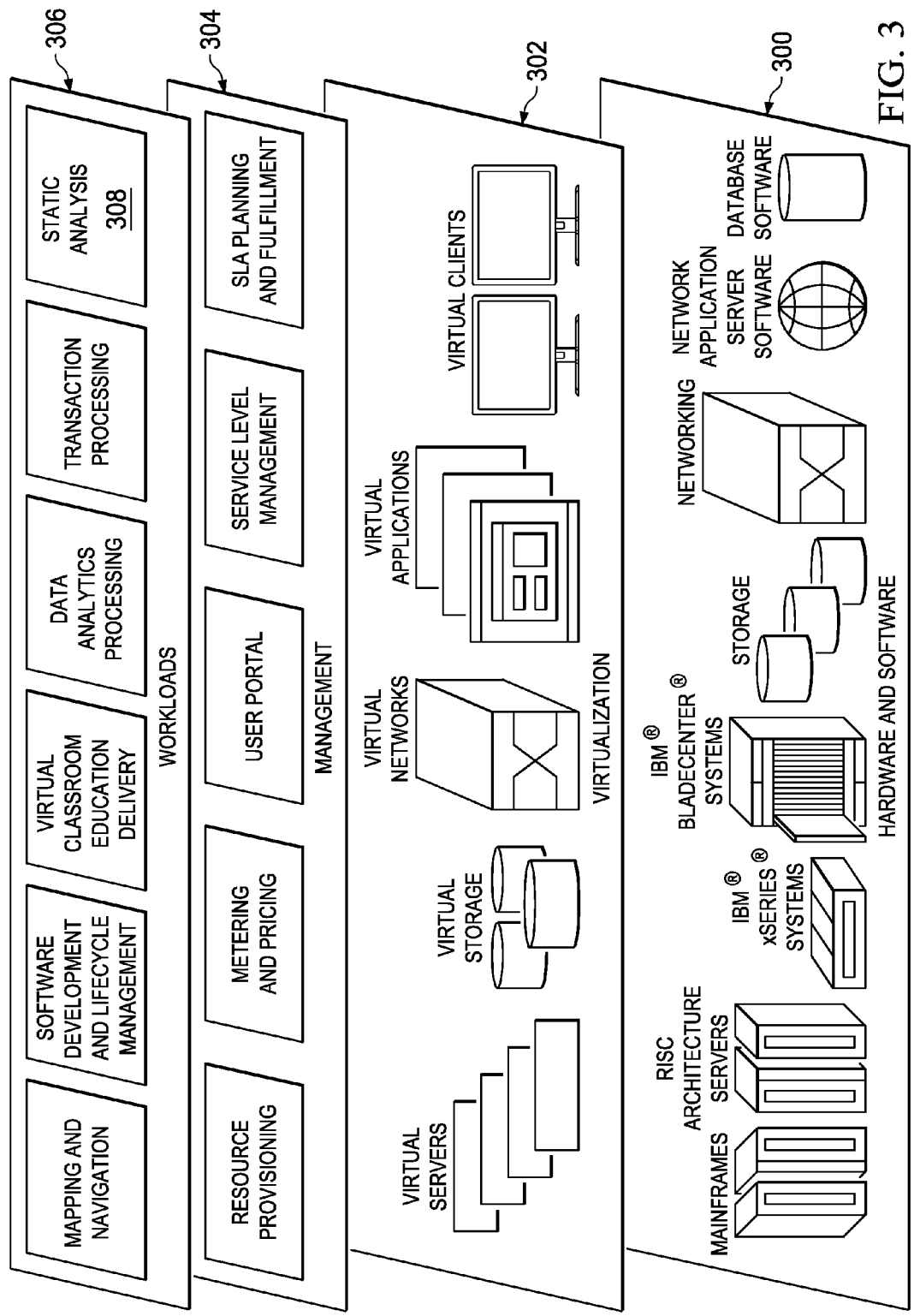
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from sources of taint (or "sources"), typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source (of taint), San, Sink>, where Source of taint denotes source code statements (e.g., methods or application programming interfaces (APIs)) that read untrusted user inputs, San denotes downgrader statements that endorse untrusted data by validating and/or sanitizing it, and Sink denotes sink statements which perform security-sensitive operations. Given a security rule R, any flow from a source of taint in $Source_R$ to a sink in $Sink_R$ that does not pass through a downgrader from $San_R$ comprises a potential vulnerability. This approach thus reduces security analysis to a graph reachability problem.

More formally, the structure of a security alarm reported by a static security analysis tool is a sequence of code statements typically known as a "witness." A first statement along the sequence reads (untrusted) data input by the user (e.g., data from the file system, a socket, a database or an HTTP request). A last statement in the sequence performs a security-sensitive operation (e.g., updating a database or a file, rendering data to an HTTP response or writing to a socket). The first statement is the source of taint, and the last statement is the sink. One or more intermediate statements establish data flow between the source and the sink. Relevant features that can be defined over a security witness include one or more of the following: witness length, namely, the length of the sequence; source type, namely, a security category of the source of taint statement; sink type, namely, a security category of the sink statement; witness type, namely, the security vulnerability associated with the witness as a whole (e.g., cross-site scripting (XSS), SQL injection (SQLi), etc.); condition statements, namely, the number of conditional expressions (if and while statements) along the witness; method calls; namely, the number of method invocations along the witness; string operations, namely, the number of string operations applied to data flowing along the witness, and so forth. As an example, if the string value emanating from the source of taint undergoes multiple string operations along the witness, then it is less likely to contain a security payload. Similarly, because static analysis is imprecise and can only approximate concrete program runs, a witness containing multiple branching statements and/or method invocations is less likely to be feasible.

As a concrete example, consider a call flow graph generated by a security scanning application with respect to a typical web application. The tool applies a static analysis to analyze the web application to identify potential security vulnerabilities. As noted, the control flow graph represents a model of data flow of web application during its execution, and identifies those parts of the application to which a particular value assigned to a variable might propagate. The control flow graph can be presented to a user as a security report. Moreover, the model represented by the control flow graph can be analyzed to facilitate identification of various security vulnerabilities. In particular, the control flow graph represents of one or more data flow paths that a value, such as user-provided data, assigned to a variable might traverse through the computer program during its execution. The control flow graph can include various nodes that represent statements, functions, methods and/or modules of the computer program. As described, respective nodes of the control flow graph can represent a source, a sink, and a downgrader. The control flow graph also can include a myriad of other nodes, such as node representing a module (or function, method or statement).

As described, the source is a statement in the computer program code that reads user-provided data assigns that data to a variable which is processed by the computer program. For example, in the web application, the source can read a user-provided HTTP parameter, a parameter in a uniform resource identifier (URI) (e.g., a uniform resource locator (URL)) field, alphanumeric text and/or symbols, data from a file or database, or the like. The sink is a statement in the computer program code that performs a security-sensitive operation on the user-provided data. In this example, the sink can read the user-provided data, store the user-provided data to a database (e.g., create or update a database record), initiate one or more operations corresponding to the user-provided data (e.g., delete a database record, retrieve data, etc.), read data from a file indicated by the user-provided data, render content indicated by the user-provided data to a response HTML message generated by a web application, or the like. As described, the downgrader is the function or module configured to endorse, validate and/or sanitize the user-provided data, which may be considered to be untrusted data. In this example, the downgrader can validate HTML encoding provided in the user-provided data, check for malicious patterns or content in the user-provided data, or the like.

During static analysis of the computer program, the security analysis application analyses the computer model represented by the control flow graph, to determine whether there are potential paths, during execution of the computer program, from the source to the sink without the user-provided data being downgraded by the downgrader. One such path is indicated in the control flow graph by an edge. This path generally is undesirable, and may indicate some security vulnerability in the computer program. In this regard, the edge can represent a witness to a security vulnerability, and thus (as described) is a witness that is then reported as a "finding" to the user.

Figure 4:
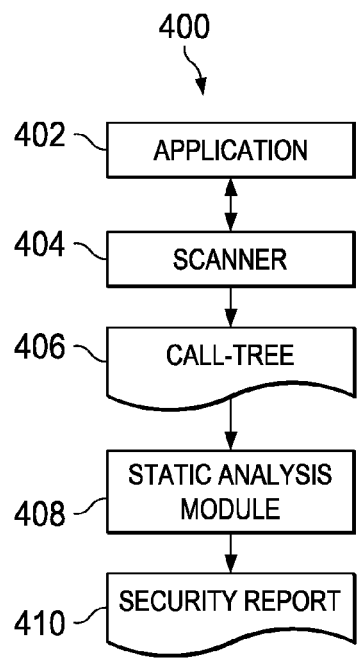
FIG. 4 is a block diagram illustrating a technique for analyzing vulnerable information flows in an application.

FIG. 4 is a block diagram illustrating a system 400 for analyzing vulnerable information flows in an application 402. In this example, a scanner used to create the call-tree is a black-box scanner, but this is not a limitation. As seen in FIG. 4, while the application 402 executes, the scanner 404 performs a scan of the application and, based on the scan, generates a call-tree 406 representing call stacks arising in the application during processing of test inputs provided to the application 402. The call-tree 406 may be pre-generated or provided from some other data source (e.g., a configuration file). As depicted, the system 400 includes a static analysis module 408 that performs a static analysis of the application 402. Specifically, the static analysis module 408 performs a static analysis of the call-tree 406 in which the call stacks identified by the black-box scanner 404 are recorded. As described above, in this way the static analysis module 408 can identify paths (i.e., flows) in the call-tree 406 that potentially represent security vulnerabilities in the application 402. For example, the static analysis module 408 can generate a security report 410 that indicates such paths as witnesses to security vulnerabilities. The security report 410 can be made to be available to a user in any suitable manner. For example, the security report 410 can be presented on a display, presented in a printout, stored to a file, or the like.

Solution-Centric Reporting of Security Warnings

With the above as background, the subject matter of this disclosure is now described.

As noted above, the technique of this disclosure provides an automated analysis tool performing static security analysis that generates a solution-centric security report. As noted above, the report may be provided in one or more formats, e.g., output as HTML as one or more web pages, provided as a printout, stored to a file, provided as a data stream, or in any other manner.

As described above, the solution-centric approach herein advantageously transitions the analysis report from the problem space (the warnings themselves) to the solution space (potential solutions to the identified problems). In other words, instead of reporting raw findings to the user, the system here outputs proposed solutions to eliminate the defects. As will be seen, a consequence of this approach is that the report generated by the analysis tool is much more consumable, and thus much more actionable by the end user. In particular, instead of providing a lengthy list of security warnings (many of which may be false) that must be parsed and analyzed, the report provides the user with one or more candidate location(s) at which to apply a fix to an identified security problem.

Mature software systems often include very large numbers of code pathways. As is well-known, and as described generally above, security scanners can analyze a software system and report source (or bytecode or binary) pathways that are potential security flaws in such a system. The analysis can itself generate a large list of flawed pathways (or findings). Typically, a flawed pathway begins at a "source" location (where untrusted input is read), and it ends in a "sink" location (where a security-sensitive operation is executed).

In static analysis, the representation of how the data flows through the system under analysis is referred to as a "trace." A trace typically includes a set of access points or "nodes" through which the data flows through the system. Typically, a node (sometimes referred to as a "trace node" represents a location in a source file. A trace is a set of trace nodes. Some of the nodes may represent user-accessible nodes in that the user can affect and change their behavior (e.g., because the user has access to the source code), while other nodes are such that a user cannot change them (e.g., because they are part of a third party library, or the like). Traces in many cases share common pathways and thus common access points. Thus, for example, common pathways are often generated by library functions in source code.

According to this disclosure, a solution-centric report is generated by the analysis tool. The reporting functionality may be implemented natively, or provided by systems, processes, programs or modules external to the analysis tool. Generally, the technique of this disclosure works as follows. The code pathway traces generated by the analysis tool are received and then processed to attempt to locate optimal fix points where a validator or sanitizer can remove the potentially malicious data from the system while allowing good data to continue through. The basic notion is to group findings, preferably based on common and user-accessible nodes, to identify a smaller list of user-addressable solution points. These points are then included in the output report.

Figure 5:
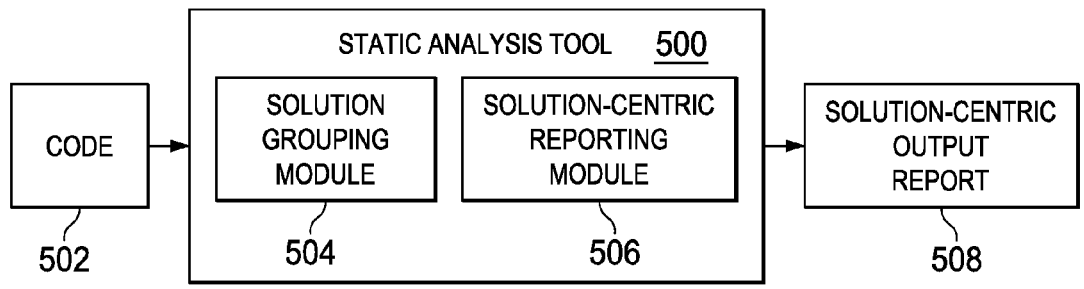
FIG. 5 is a block diagram of a static analysis tool that is augmented to include the solution-centric reporting functionality of this disclosure.

FIG. 5 illustrates these high level functions. As depicted, the system under test 502 is received by the static analysis tool 500, which includes the basic functionality described above with respect to FIG. 4. According to this disclosure, the tool 500 is augmented (or extended) to include two new modules, a solution grouping module 504, and a solution-centric reporting module 506. These modules may be implemented in software, as one or more computing programs having program instructions executing in hardware. The modules are shown as part of the analysis tool 500, but this is not a limitation. The modules may be combined or separate, local or remote, or part of one or more other systems. The solution grouping module 504 provides the high level function of applying one or more solution group methods to the traces to generate one or more "solution groups." As used herein, a "solution group" is a group of nodes that are found by a particular solution group method. As will be seen, the nodes in a solution group typically are nodes within the pathways of a trace, but this is not a limitation, as the nodes in the solution group may also include source and sink nodes as well.

Generalizing, a solution group comprises one or more nodes that exist in (or across) multiple traces. In particular, when multiple traces are viewed collectively, the traces represent overlapping graphs, and a particular solution group (generated by a particular solution group method) identifies particular subsets of those graphs. The solution grouping(s) output from the solution grouping module 504 are provided to the solution-centric reporting module 56, which outputs the solution-centric report 508.

Figure 6:
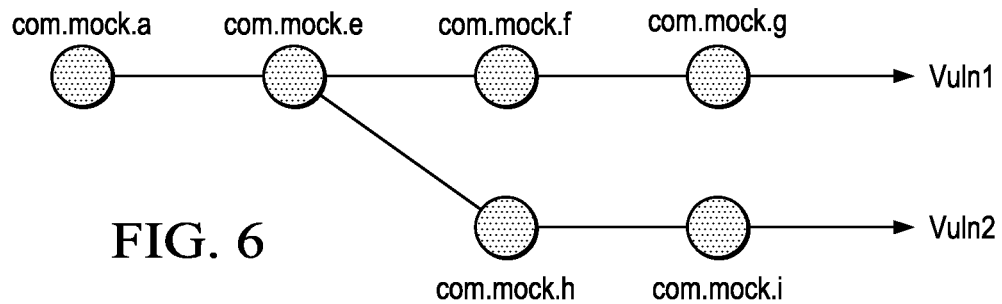
FIG. 6 depicts a portion of a pathway graph showing a node that can represent a divergent or convergent point.

As noted, the solution grouping module 504 processes the traces using one or more different "solution group" methods. Each such method preferably operates on different types of nodes, which may be defined as follows. A "common node" simply refers to a node that is found to be present across traces. Typically, common nodes are identified by simple counting. Another type of node is a "convergence node." The convergence or "convergent" node is the most common node shared among a group of findings that is closest to a source without being the source. Yet another type of node is a "divergence node." The divergence or "divergent" node is the most common node shared among a group of findings that is closest to the sink without being the sink. By definition then, convergent and divergent nodes are also common nodes. By way of example, FIG. 6 is a graph 600 including a set of pathways; when viewed from left-to-right, the node labeled "com.mock.e" represents a divergent node. In the alternative, and when the graph is viewed from right-to-left, the same node represents a convergent node. Another common node types include most common "source node" and most common "sink node." The most common "source node" is the source of taint coming into the system shared among a group of findings. The most common sink node is the where the taint leaves the system shared among a group of findings. These node types are merely representative and other types or variants of the identified types may be implemented.

The particular solution group method implemented by the solution grouping module 504 is dependent on the type of node. Thus, for example, the "common node" solution group method involves iterating through the nodes for each finding and adding to a list of common nodes. The list is then incremented for each occurrence in a finding for the common node. This produces "common node" solution groups that have at least the one node in common with no other considerations. The convergent node solution grouping method starts with the common node solution (the counts) and performs a further refinement. In particular, the convergent node solution grouping preferably uses a statistical measure, such as the harmonic mean of the count of occurrences of the common node and the distance in nodes from the source node. This calculation produces a list of solution groups that have at least the one convergent node closest to the source in common. Likewise, the divergent node solution grouping method starts with the counts, and then uses the harmonic mean of the count of occurrences of the common node and the distance in nodes from the sink node. This calculation produces a list of solution groups that have at least the one divergent node closest to the sink in common. Statistical measures other than the harmonic mean may be used, and a particular solution group method may implement some other computational method to generate the solution grouping. As also described above, the most common "source node" is the source of taint coming into the system shared among a group of findings. The most common sink node is the where the taint leaves the system shared among a group of findings.

The solution group methods may operate collectively and with respect to different vulnerability types. Thus, and with respect to FIG. 6 for example, the convergent node is labeled "com.mock.a," and the divergent node is labeled "com.mock.e." In this example, the interval extending between the convergent and divergent nodes coincides with the set of candidate locations to simultaneously solve both vulnerability issues, labeled "Vuln1" and "Vuln2." This observation can be exploited by the following algorithm. In particular, at step (1), the algorithm groups the issues according to a measure of overlap between them in terms of common taint nodes. In one embodiment, this is achieved by identifying a representative node per finding. That node optimizes an objective function that considers (i) distance from sink (minimal for maximal sink and thus fix content), and (ii) frequency across the entire set of findings (maximal). At step (2), and for each group $\{v_1, \ldots v_n\}$ of issues resulting from the first step, the routine then identifies the convergent and divergent nodes across all the issues $v_i$. At step (3), and along the interval extending between the convergent and divergent nodes, the routine then marks (as candidates for fixing) all the nodes that are in user rather than library code. These are the nodes that are then output in the report. In this manner, only a single report is generated per the entire set $\{v_1, \ldots v_n\}$ of vulnerable flows, and the report is in the form of candidate solutions. The report thus includes actionable information and can be provided to interested users and others (e.g., developers).

Figure 7:
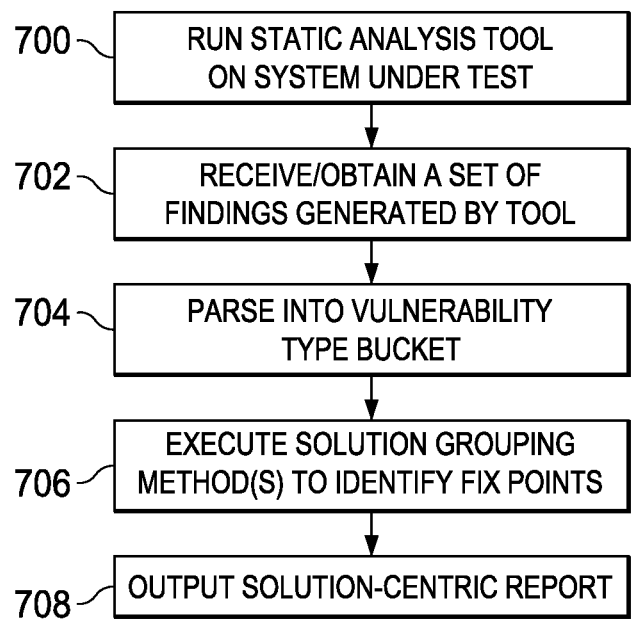
FIG. 7 depicts a process flow of a solution grouping and reporting technique of this disclosure.

While the approach described in the previous paragraph provides a useful solution-centric report, FIG. 7 depicts a more preferred approach where the solution grouping preferably is carried out on a per-vulnerability type basis as opposed to across multiple vulnerability types. This optimization takes advantage of the fact that different vulnerabilities exhibit distinct behaviors that may influence the type of solution group method(s) that may be implemented. Thus, for example, SQLi vulnerabilities are generally solved by replacing direct query calls (executeQuery) with parameterized queries. XSS vulnerabilities, on the other hand, are solved commonly by either sanitizing the source, or by replacing the write call with a library which cleans the data at the sink. Thus, solution group methods that provide for source node or sink group grouping may be optimal for those types of vulnerabilities. Other vulnerabilities, however, benefit from the alternative solution group methods, namely, common, convergent and divergent. Because different vulnerabilities exhibit different behaviors that may be grouped more efficiently by one solution group method over another, preferably the system herein first places vulnerability findings in their own buckets (vulnerability types) to be processed separately, as opposed to processing the whole list together.

FIG. 7 depicts the preferred technique. In general, the raw findings generated by the static analysis are first parsed by vulnerability type into findings that are on a per-vulnerability type basis. This parsing ensures that each vulnerability type is treated with an appropriate combination method. To this end, and in this embodiment, the static analysis tool is executed at step 700. At step 702, the output findings are provided to a vulnerability parser. At step 704, the parser separates the findings, preferably on a per-vulnerability type (e.g., SQLi, XSS, etc.) basis. In other words, the parser "buckets" the vulnerability findings by type. At step 706, one or more solution grouping method(s) are applied to a particular vulnerability finding type. The output report in then generated (per-vulnerability type) a step 708. This approach takes advantage of the fact that the strategy for determining where a particular fix should be typically varies by vulnerability type. Thus, the most common fix node for a particular vulnerability type varies.

A particular report output by the system also may also be a composite report that consolidates the findings generated at step 706.

As noted above, there are many different solution group methodologies that may be used to combine the list of findings through the taint nodes. They include, without limitation, "most common" source node, "most common" node, "convergent," "divergent" and "most common" sink node. This nomenclature is not intended to be limiting. There are tradeoffs for using each of the solution group methodologies, and it may be desirable to use a particular solution group method (over another such method), depending on the type of vulnerability, or other considerations.

Figure 8:
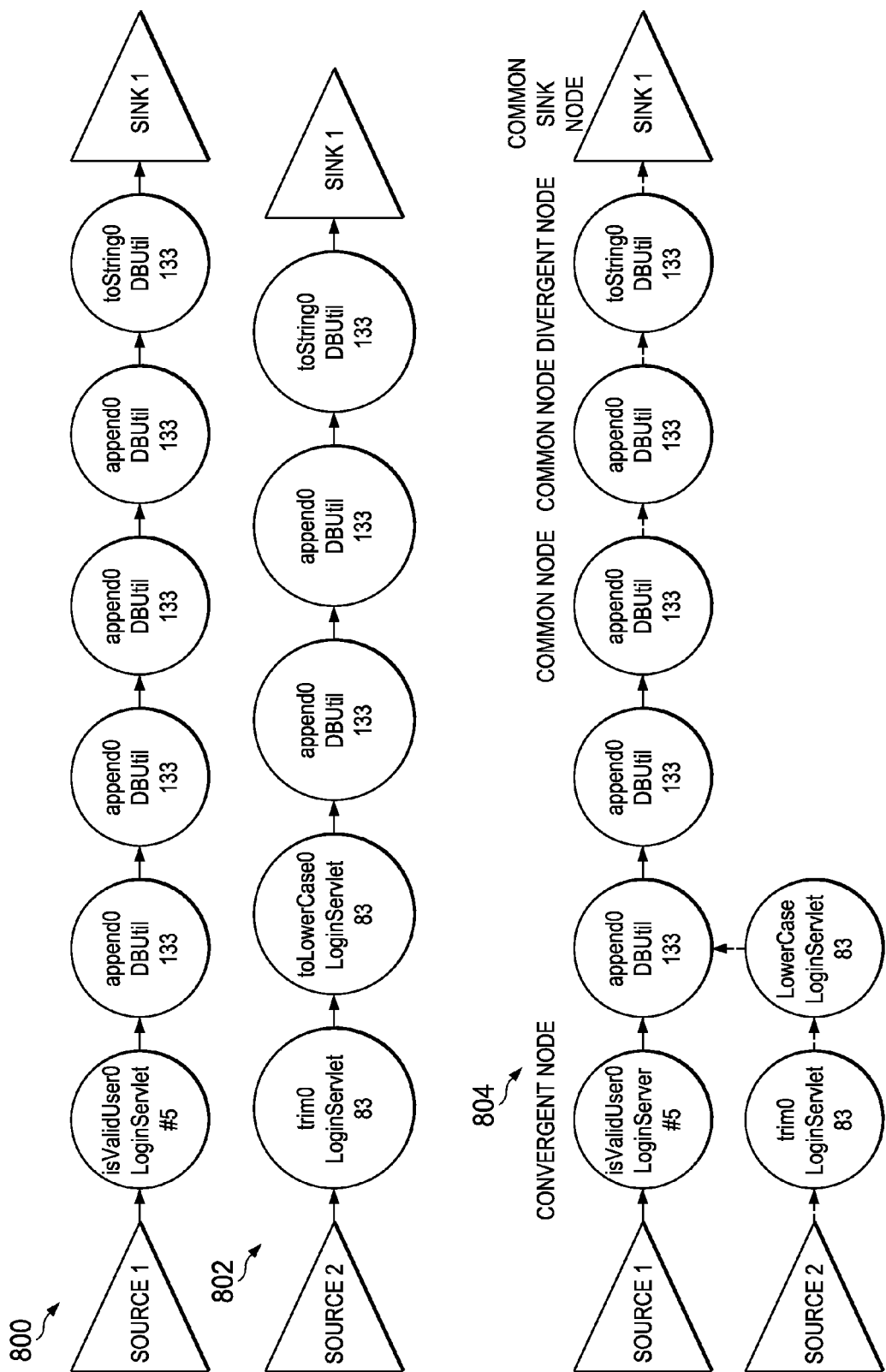
FIG. 8 depicts a pair of vulnerability type traces, and how these traces may be overlapped by a solution grouping.

FIG. 8 depicts the solution grouping for a pair of traces 800 and 802 for a particular vulnerability type (SQLi). The trace 800 includes a set of taint nodes between a first source and an identified sink. The trace 802 includes a set of taint nodes between a second source and the identified sink. When the traces are overlaid (or overlapped) by the solution grouping method, the graph 804 results. The convergent and divergent nodes, as well as the other common nodes, are identified. FIGS. 9-11 depict portions of a representative solution-centric report that corresponds to this mapping. The layout and format of the report are merely representative. This report may be generated as HTML (one or more web pages). FIG. 9 is an executive summary and identifies the Issue Type and the Fix Recommendation. FIG. 10 depicts the first issue in detail, and FIG. 11 depicts the fix recommendation provided by the report. In this example, a fix location is the executeQuery call, as well as an alternate location identified by the bold lettering isValidUser.

Although not shown, the report also may include other information such as advisories about vulnerabilities, and other mitigation information.

A solution point identified by the technique herein represents an application programming interface (API) to which a sanitization or validation routine could then be added, thereby removing or mitigating the impact the vulnerability might otherwise have on the software system.

The technique as described herein provides significant advantages. Most importantly, it provides a solution-centric reporting of security warnings produced by an analysis tool. The report provides the user with information about the most efficient and valuable places in the code to address vulnerabilities. The approach obviates the user having to manually review all the findings and determine their correctness, which is tiresome, bothersome and undermines the benefits of automation. Rather, in the described solution-centric approach, the user is provided with a meaningful and actionable report to jump-start his or her efforts to address one or more security vulnerabilities identified by the analysis tool.

Preferably, the techniques herein are implemented in associated with a static analysis tool, such as IBM Security AppScan. The reference to this commercial product is exemplary and should not be taken to limit the disclosed technique, which may be implemented on any appliance (or, more generally, machine) having the general characteristics and operating functionality that has been described. The technique also is not limited for use with static analysis tools, as the solution-centric reporting may be used for dynamic analysis tools, or for any other software development, testing or support systems.

This subject matter may be implemented as-a-service. As previously noted, and without limitation, the subject matter may be implemented within or in association with a cloud deployment platform system or appliance, or using any other type of deployment systems, products, devices, programs or processes. The solution grouping and reporting functionality may be provided as a standalone function, or it may leverage functionality from other analysis products and services.

A representative cloud application platform with which the described functionality may be implemented includes, without limitation, any cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the solution-centric reporting service be executed by a particular component as named above, as the functionality herein (or any aspect thereof) may be implemented in other or systems.

The above-described functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, web and mobile applications and systems, as well as improvements to the functioning of security analysis tools and systems.

Having described our invention, what we now claim is as follows:

1. A method of automated analysis on source files of a software system, comprising:
    performing a set of operations in an automated manner during a static analysis of the source files performed by a security scanner, the operations comprising:
        receiving sets of trace data each representing a potential security flaw in the software system, the trace data comprising a set of trace nodes;
        parsing the sets of trace data by vulnerability type;
        analyzing the sets of trace data to identify a solution group comprising trace nodes that exist across the sets of trace data;
        processing the trace nodes in the solution group by iterating through the trace data and counting occurrences of a trace node to identify a reduced set of common nodes representing one or more potential fix points for a security flaw, the reduced set of common nodes including a most common node that is closest to a sink without being the sink, the one or more potential fix points having associated therewith a recommendation for addressing the security flaw;
        configuring the one or more potential fix points as an application programming interface (API) to which a sanitization or validation routine is configured to be coupled to attempt to address the security flaw.

2. The method as described in claim 1 wherein the trace nodes are further processed by determining a most common node shared among a group of trace data sets that is closest to a source without being the source.

3. The method as described in claim 1 wherein the trace nodes are further processed by determining a most common source shared among a group of trace data sets.

4. The method as described in claim 1 wherein the trace nodes are further processed by determining a most common sink shared among a group of trace data sets.

5. The method as described in claim 1 wherein the reduced set of common nodes representing one or more potential fix points for the security flaw are nodes with user-accessible source files.

6. Apparatus, comprising:
    a processor;
    computer memory holding computer program instructions executed by the processor to perform automated analysis on source files of a software system, the computer program instructions operative in an automated matter during a static analysis of the source files performed by a security scanner to:
        receive sets of trace data each representing a potential security flaw in the software system, the trace data comprising a set of trace nodes;
        parse the sets of trace data by vulnerability type;
        analyze the sets of trace data to identify a solution group comprising trace nodes that exist across the sets of trace data;
        process the trace nodes in the solution group by iterating through the trace data and counting occurrences of a trace node to identify a reduced set of common nodes representing one or more potential fix points for a security flaw, the reduced set of common nodes including a most common node that is closest to a sink without being the sink, the one or more potential fix points having associated therewith a recommendation for addressing the security flaw; and
        configure the one or more potential fix points as an application programming interface (API) to which a sanitization or validation routine is configured to be coupled to attempt to address the security flaw.

7. The apparatus as described in claim 6 wherein the computer program instructions are further operative to process the trace nodes to identify a most common node shared among a group of trace data sets that is closest to a source without being the source.

8. The apparatus as described in claim 6 wherein the computer program instructions are further operative to process the trace nodes to identify a most common source shared among a group of trace data sets.

9. The apparatus as described in claim 6 wherein the computer program instructions are further operative to process the trace nodes to identify a most common sink shared among a group of trace data sets.

10. The apparatus as described in claim 6 wherein the reduced set of common nodes representing one or more potential fix points for the security flaw are nodes with user-accessible source files.

11. A computer program product in a non-transitory computer readable medium for use in a data processing system, the computer program product holding computer program instructions executed by the data processing system to perform automated analysis on source files of a software system, the computer program instructions operative in an automated matter during a static analysis of the source files performed by a security scanner to:
    receive sets of trace data each representing a potential security flaw in the software system, the pathway data comprising a set of trace nodes;
    parse the sets of trace data by vulnerability type;

analyze the sets of trace data to identify a solution group comprising trace nodes that exist across the sets of trace data;

process the trace nodes in the solution group by iterating through the trace data and counting occurrences of a trace node to identify a reduced set of common nodes representing one or more potential fix points for a security flaw, the reduced set of common nodes including a most common node that is closest to a sink without being the sink, the one or more potential fix points having associated therewith a recommendation for addressing the security flaw; and configure the one or more potential fix points as an application programming interface (API) to which a sanitization or validation routine is configured to be coupled to attempt to address the security flaw.

12. The computer program product as described in claim 11 wherein the computer program instructions are further operative to process the trace nodes to identify a most common node shared among a group of trace data sets that is closest to a source without being the source.

13. The computer program product as described in claim 11 wherein the computer program instructions are further operative to process the trace nodes to identify a most common source shared among a group of trace data sets.

14. The computer program product as described in claim 11 wherein the computer program instructions are further operative to process the trace nodes to identify a most common sink shared among a group of trace data sets.

15. The computer program product as described in claim 11 wherein the reduced set of common nodes representing one or more potential fix points for the security flaw are nodes with user-accessible source files.

* * * * *